United States Patent
Shinozaki

(10) Patent No.: US 8,591,160 B2
(45) Date of Patent: Nov. 26, 2013

(54) CLIP

(75) Inventor: Nobuya Shinozaki, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 251 days.

(21) Appl. No.: 12/736,266

(22) PCT Filed: Oct. 14, 2008

(86) PCT No.: PCT/JP2008/068530
§ 371 (c)(1),
(2), (4) Date: Sep. 24, 2010

(87) PCT Pub. No.: WO2009/118936
PCT Pub. Date: Oct. 1, 2009

(65) Prior Publication Data
US 2011/0014005 A1    Jan. 20, 2011

(30) Foreign Application Priority Data
Mar. 25, 2008    (JP) .............................. P. 2008-078365

(51) Int. Cl.
*F16B 21/06* (2006.01)

(52) U.S. Cl.
USPC ................................ 411/347; 411/21; 24/458

(58) Field of Classification Search
USPC .............. 411/21, 347, 348, 508, 913; 24/458, 24/289, 581.11, 573.11
See application file for complete search history.

(56) References Cited

U.S. PATENT DOCUMENTS

| 1,082,455 | A | * | 12/1913 | Tilton | .............................. | 24/607 |
| 2,405,400 | A | * | 8/1946 | Butterfield | ..................... | 411/348 |
| 2,620,537 | A | * | 12/1952 | Gobin-Daude | ................. | 411/21 |
| 3,534,650 | A | * | 10/1970 | Kubokawa | ..................... | 411/344 |

(Continued)

FOREIGN PATENT DOCUMENTS

| CH | 421619 | 9/1966 |
| JP | 55-61677 | 4/1980 |

(Continued)

*Primary Examiner* — Flemming Saether
(74) *Attorney, Agent, or Firm* — McGinn IP Law Group, PLLC

(57) ABSTRACT

A clip is provided which can flexibly deal with a change in thickness of a member in which a mounting hole is formed so as to be stably fixed in the mounting hole without any looseness.
This clip 10 includes a grommet 20 and a pin 40. The pin 40 has a head portion 41, a shaft portion 43 which projects from one side of the head portion 41, first locking pieces 50 which are provided flexibly on an outer circumference of the shaft portion 43 so as to be brought into engagement with a circumferential edge of the mounting hole 3 and first engagement portions 50 which are brought into engagement with the grommet 20 so as to prevent the dislodgement of the pin 40. The grommet 20 has a flange portion 21 having an insertion hole 25, a cylindrical portion 29 which projects from a circumferential edge of the insertion hole 25, opening portions 34 which allow the first locking pieces 50 to project therefrom, and cutout grooves 27 which are brought into engagement with the first engagement portions 51 so as to hold the pin 40 so as not to be dislodged therefrom in such a state that the pin 40 is allowed to be pushed in further. Then, a coil spring 70 is interposed between the grommet 20 and the pin 40 so as to bias the pin 40 in an opposite direction to a direction in which the pin 40 is pushed into the grommet 20.

6 Claims, 12 Drawing Sheets

(56) References Cited

U.S. PATENT DOCUMENTS

| | | | |
|---|---|---|---|
| 3,669,481 A * | 6/1972 | Bergmann | 292/49 |
| 4,782,562 A * | 11/1988 | Yuta | 24/297 |
| 4,927,287 A * | 5/1990 | Ohkawa et al. | 403/408.1 |
| 5,845,898 A | 12/1998 | Halder et al. | |
| 7,730,930 B2 * | 6/2010 | Malausa et al. | 160/310 |
| 8,245,367 B2 * | 8/2012 | Kato et al. | 24/458 |

FOREIGN PATENT DOCUMENTS

| | | |
|---|---|---|
| JP | 58-151708 | 10/1983 |
| JP | 4-34507 | 3/1992 |
| JP | 7-16014 | 3/1995 |
| JP | 7-190029 | 7/1995 |
| JP | 10-131929 | 5/1998 |

* cited by examiner

*Fig. 11A*
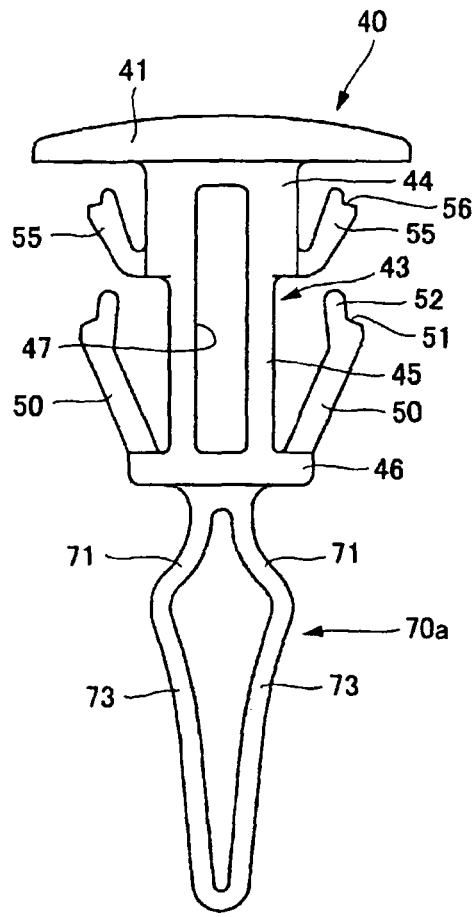
*Fig. 11B*
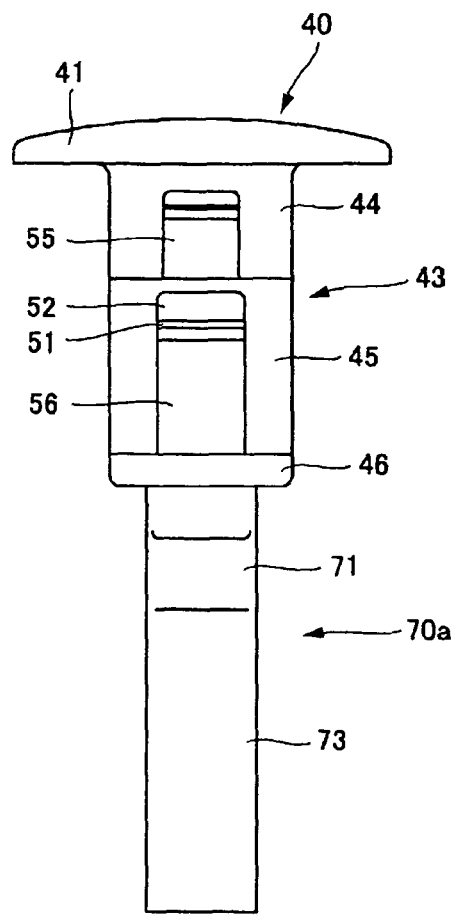
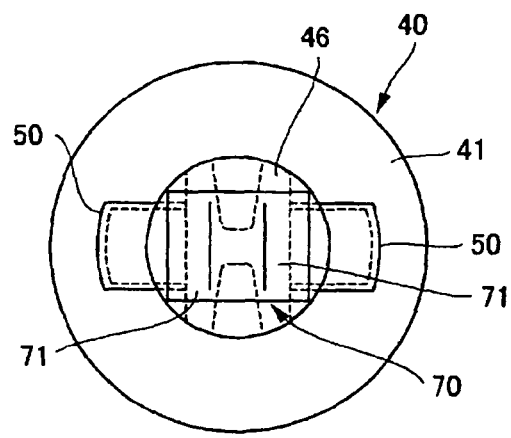
*Fig. 11C*

CLIP

TECHNICAL FIELD

The present invention relates to a clip which includes a grommet and a pin and which is inserted to be fixed in a mounting hole.

BACKGROUND ART

For example, a mounting-subject member such as a trim board cover is detachably mounted on a mount-base member such as a body panel of a vehicle. To detachably mount one member on the other member, a clip including a grommet and a pin is used.

Conventionally, as such clip, Patent Document 1 discloses a clip (an expansion type rivet for fastening overlapping plates) including a grommet (a female member) and a pin (a male member). The grommet has a collar, elastic leg pieces which extends from the collar while being divided via a cutout portion and which is adapted to flex and projections which project radially inwards from lower ends of the elastic leg pieces. The pin has a head portion, a shaft portion which extends from the head portion, an expansion portion which is formed at an axially intermediate position along the length of the shaft portion so as to expand the elastic leg pieces radially outwards and recess portions formed vertically in the expansion portion for accommodating and catching therein the lower ends of the elastic leg pieces.

Then, the pin is inserted into the grommet and the projections at the lower ends of the elastic leg pieces are brought into engagement with the recess portions at a proximal end portion side of the shaft portion, whereby the pin is held in the grommet so as not to be dislodged therefrom. With the pin kept in that state, when the clip is inserted into mounting holes of both members and the pin is pushed further into the grommet, the projections are pushed to be expanded from inside by the expansion portion so as to open the elastic leg pieces, whereby both the elastic leg pieces are brought into engagement with a circumferential edge on a backside of the mounting hole in one member, while the collar is brought into abutment with the other member, both the members being thereby coupled together via the clip.

Patent Document 1: JP-UM-H04-034507-A

DISCLOSURE OF INVENTION

Problem to be Solved by Invention

In the clip shown in Patent Document 1, an angle at which each elastic leg piece is opened when the pin is pushed into the grommet is set in accordance with a thickness of a member such as a body panel.

As a result, for example, in the case of the member being thinner than a certain dimension or a relatively soft member such as a trim board becoming thin due to permanent setting in fatigue, a gap is produced between outer circumferences of upper end portions of the elastic leg pieces (portions to be brought into engagement with the mounting hole) and the mounting hole. This prevents the elastic leg pieces from being brought into firm engagement with the circumferential edge of the back side of the mounting hole, leading to a risk of the clip being loosened.

On the other hand, in the case of the member being thicker than the certain dimension, the elastic leg pieces strongly strike the mounting hole. This applies an excessive load to the elastic leg pieces, whereby the elastic force of the elastic leg pieces are gradually reduced, and there is caused a possibility that the fixing force with which the elastic leg pieces are fixed to the mounting hole is reduced, which is not preferable.

In this way, the clip described in Patent Document 1 cannot flexibly deal with the change in the thickness of the member in which the mounting hole is formed, causing a problem that it is difficult to fix the clip in the mounting hole without any looseness.

Consequently, an object of the invention is to provide a clip which can flexibly deal with a change in thickness of a member in which a mounting hole is formed so that the clip can be stably fixed in a mounting hole without any looseness.

Means for Solving the Problem

To attaining the object, according to a first invention, there is provided a clip including a grommet and a pin which is inserted into the grommet and adapted to be inserted to be fixed in a mounting hole, wherein the pin has a head portion, a shaft portion which projects from one side of the head portion, a locking piece which is provided flexibly on an outer circumference of the shaft portion so as to be locked on a circumferential edge of the mounting hole, and an engagement portion which is brought into engagement with the grommet so as to prevent a dislodgement, wherein the grommet has a flange portion having an insertion hole into which the shaft portion of the pin is inserted, a cylindrical portion which projects from a circumferential edge of the insertion hole in the flange portion, an opening portion which is formed in a circumferential wall of the cylindrical portion so as to allow the locking piece of the pin to project therefrom and a holding portion which is brought into engagement with the engagement portion of the pin so as to hold the pin in such a state that the pin can be pushed in further, while preventing the dislodgement, and wherein an urging unit is provided to urge the pin in an opposite direction to a direction in which the pin is pushed in relative to the grommet.

According to the above invention, by pushing the pin into the grommet and bringing the engagement portion into engagement with the holding portion, the pin can be held in the grommet while being prevented from being dislodged therefrom with the locking piece allowed to project from the opening portion and the pin biased to the opposite side to the direction in which the pin is pushed in. By inserting the cylindrical portion of the grommet and the shaft portion of the pin into the mounting hole in that state, the locking piece is brought into engagement with the circumferential edge of the mounting hole, thereby making it possible to fix the clip in the mounting hole.

As this occurs, since the pin is biased in the opposite direction to the direction in which it is pushed in by the urging unit, the locking piece is allowed to be pressed towards the back side of the mounting hole. As a result, even in the event that the member in which the mounting hole is formed is thick or becomes thinned due to permanent setting in fatigue, the clip can deal with such a change in thickness as required and can be fixed in the mounting hole without any looseness by the locking piece which is pressed against the circumferential edge of the back side of the mounting hole by the urging unit.

According to a second invention, there is provided a clip of the first invention, wherein the urging unit is a coil spring which is interposed between the pin and the grommet.

According to the above invention, since the urging unit is the coil spring, a strong urging force can be stably applied to the pin.

According a third invention, there is provided a clip of the first or second invention, wherein the urging unit is formed integrally with the pin.

According to the above invention, since the urging unit is formed integrally with the pin, the number of components can be reduced, and the clip can be made compact. In addition, the pin and the grommet can be assembled into the clip by simply pushing the pin into the grommet, thereby making it possible to enhance the assembling properties of the clip.

According to a fourth invention, there is provided a clip of the first or second invention, wherein the urging unit is formed integrally with the grommet.

According to the above invention, since the urging unit is formed integrally with the grommet, the number of components can be reduced and the clip can be made compact, thereby making it possible to enhance the assembling properties of the clip.

According to a fifth invention, there is provided a clip of any of the first to fourth inventions, wherein a cutout groove is formed in an inner circumference of the insertion hole in the flange portion so as to allow the locking piece of the pin to pass therethrough while flexing inwards, wherein, when the locking piece is inserted into the insertion hole, a distal end portion of the locking piece is brought into engagement with a back side of the cutout groove, and wherein the distal end portion of the locking piece constitutes the engagement portion and the cutout groove constitutes the holding portion.

According to the above invention, when the pin is pushed into the grommet, the distal end portion of the locking piece is brought into engagement with a circumferential edge of the cutout groove, whereby the pin is held in the grommet so as to be prevented from being dislodged therefrom. In addition, since the distal end portion of the locking piece functions as the engagement portion and the holding portion is made up of the cutout groove formed in the flange portion of the grommet, the pin can be held in the grommet so as not to be dislodged therefrom only by pushing the pin slightly into the grommet. As a result, an overall length of the clip with the clip fixed in the mounting hole can be made short, and a push-in amount of the pin into the grommet can be ensured long, thereby making it possible to deal with a change in thickness of the member in which the mounting hole is formed over a wider range.

According to a sixth invention, there is provided a clip of any of the first to fourth inventions, wherein a through hole is formed in a bottom portion of the cylindrical portion and an engagement claw is formed at a distal end of the shaft portion of the pin so as to be inserted through the through hole for engagement with a circumferential edge on the projected side of the through hole, and wherein the through hole constitutes the holding portion and the engagement claw constitutes the engagement portion.

According to the above invention, when the pin is pushed into the grommet, the engagement claw at the distal end of the shaft portion of the pin is brought into engagement with the circumferential edge on the projected side of the through hole, whereby the pin is held in the grommet so as to be prevented from being dislodged therefrom. In addition, since the shaft portion of the pin is inserted in the through hole in the bottom portion of the cylindrical portion, a push-in amount of the pin into the grommet can be ensured. Additionally, in the case of the coil spring being used as the urging unit, since the shaft portion of the pin can be inserted into the coil spring, the inclination and offset in position of the coil spring can be suppressed.

Advantage of Invention

According to the clip of the invention, by pushing the pin into the grommet so that the engagement portion is brought into engagement with the holding portion, the locking piece is caused to project from the opening portion, and the pin is held in the grommet so as not to be dislodged therefrom with the pin biased towards the opposite side to the direction in which the pin is pushed in. Then, by inserting the clip into the mounting hole in that state, the locking piece is brought into engagement with the circumferential edge of the back side of the mounting hole, whereby the clip can be fixed in the mounting hole.

As this occurs, since the pin is biased in the opposite direction to the direction in which the pin is pushed in by the urging unit, the locking piece is pressed towards the back side of the mounting hole. As a result, in the case of the member being thick in which the mounting hole is formed or even in the event that the mounting hole formed member becomes thinned due to permanent setting in fatigue, such a change in thickness of the member is dealt with as required, whereby the clip can be fixed in the mounting hole without any looseness by the locking piece which is pressed against the circumferential edge of the back side of the mounting hole.

BEST MODE FOR CARRYING OUT INVENTION

Hereinafter, an embodiment of a clip of the invention will be described by reference to FIGS. 1 to 8.

As shown in FIG. 1, this clip 10 is fixed in a mounting hole 3 formed in a mount-base member 1 such as a body panel without any looseness and includes a grommet 20, a pin 40 which is inserted into this grommet 20 and a coil spring 70 which is interposed between this pin 40 and the grommet 20 to urge the pin 40 in an opposite direction to a direction in which the pin 40 is pushed into the grommet 20. In this embodiment, the coil spring 70 constitutes the urging unit of the invention.

The clip 10 of this embodiment is used to detachably mount a mounting-subject member 5 such as a garnish, a trim board or a cover on the mount-base member 1 such as a body panel. However, the application of the clip 10 is not limited to that function. The clip 10 may be used to connect panel members together or may be fixed in a mounting hole in one member.

The mounting hole 3 formed in the mount-base member 1 has a circular shape, and a circular through hole 7 is formed in the mounting-subject member 5 so as to be aligned with the mounting hole 3. Although plural mounting holes 3 and plural through holes 7 are formed in the mount-base member 1 and the mounting-subject member 5, respectively, in reality, only one for each is shown herein for the sake of convenience.

Referring to FIGS. 1, 3 and 5 to 8, the grommet 20 will be described. This grommet 20 has a substantially circular disk-like flange portion 21 which is brought into engagement with circumferential edge of a front side of the through hole 7. An accommodation recess portion 23 is formed to be recessed a certain depth from a front surface of the flange portion 21 so that a head portion 41 of the pin 40 fits therein. A circular insertion hole 25 is formed to extend from a center of a bottom portion of the accommodation recess portion 23 so that a shaft portion 43 (which will be described later) of the pin 40 is inserted therein. A pair of cutout grooves 27, 27 are formed in facing positions on a circumferential edge portion of the insertion hole 25 so as to extend through the flange portion 21.

First engagement portions 51 of first locking pieces 50 and second engagement portions 56 of second locking pieces 55, which will be described later, are brought into engagement with circumferential edges of back sides of the cutout grooves 27 depending upon a push-in depth of the pin 40 into the grommet 20. As shown in FIG. 5, when the first engagement portions 51 are brought into engagement with the circumferential edges of the back sides of the cutout grooves 27, the pin 40 is held in the grommet 20 so as to be prevented from being dislodged therefrom in such a state that the pin 40 can be pushed in further. Namely, the cutout grooves 27 constitute the holding portion of the invention.

A cylindrical portion 29, which is adapted to be inserted into the mounting hole 3, is provided on a rear surface side of the flange portion so as to project therefrom. As shown in FIGS. 1, 3, 5, this cylindrical portion 29 has a cylindrical circumferential wall 31 which extends from a circumferential edge on a back side of the insertion hole 25 in the flange portion 21 and a bottom portion 32 which is connected to an opening portion at a distal end of the circumferential wall 31. The cylindrical portion 29 is formed into a substantially bottomed cylindrical shape. As shown in FIG. 5, one end of the coil spring 70 is supported on an inner end face of the bottom portion 32. In addition, a taper surface 32a is formed on an outer circumference of the bottom portion 32 which gradually reduces in diameter towards a distal end thereof, so as to enhance the guiding properties of the clip 10 when it is inserted into the mounting hole 3.

In addition, a pair of elongated hole-shaped opening portions 34, 34 are formed in facing positions on the circumferential wall 31 so as to be aligned with the cutout grooves 27, 27, respectively, so that the first locking pieces 50 of the pin 40 are allowed to appear therefrom or disappear thereinto. As shown in FIGS. 6, 7, a distal end side circumferential edge of the elongated hole-shaped opening portion 34 is formed so as to be positioned around a proximal end portion of the first locking piece 50 when the clip 10 is fixed in the mounting hole 3. Because of this, when the pin 40 is pushed in further from the state in which the clip 10 is fixed in the mounting hole 3, the first locking pieces 50 are pressed against by the distal end side circumferential edges of the opening portions 34, so as to be pulled inside from the opening portions 34, as shown in FIG. 8.

Next, the pin 40, which is adapted to be inserted into the grommet 20, will be described by reference to FIGS. 1, 2, 4A to 4C and 5 to 8. This pin 40 has the head portion 41 which has a substantially circular disk-like shape and which is accommodated and disposed in the accommodation recess portion 23 of the grommet 20 and the shaft portion 43 which is provided so as to project from one side of the head portion 41 and which has a substantially circular cylindrical shape.

As shown in FIGS. 4A to 4C, the shaft portion 43 includes a base portion 44 which projects from a back surface side of the head portion 41 and of which both side portions 44a, 44a constitute flat planes, an intermediate portion 45 which extends vertically from a distal end of the base portion 44 and of which both side portions 45a, 45a constitute flat planes and a circular disk-shaped distal end portion 46 which connects to the intermediate portion 45. In addition, as shown in FIGS. 4A and 4C, recess grooves 47, 47 each having a certain depth are formed in both side surfaces which intersect both the side portions 44a of the base portion 44 and the side portions 45a of the intermediate portion 45 at right angles.

The other end of the coil spring 70 is supported on a distal end face of the circular disk-shaped distal end portion 46. In addition, the distal end portion 46 is formed into a size which enables the distal end portion 46 to fit in an inner circumference of the cylindrical portion 29 of the grommet 20, so that the inclination of the shaft portion 43 is suppressed when the shaft portion 43 of the pin 40 slides within the cylindrical portion 29 of the grommet 20.

In addition, the pair of first locking pieces 50, 50, which are flexible, are provided on sides of a proximal end face of the distal end portion 46 which coincide with both the facing side portions 45a of the intermediate portion 45 so as to extend obliquely outwards to be formed into an anchor shape. The step-like first engagement portions 51, 51, which constitute the engagement portion of the invention, are provided at distal end portions of the first locking pieces 50, respectively. Insertion portions 52, 52 are provided to project from inner circumferential sides of the first engagement portions 51, 51, respectively, and the insertion portions 52, 52 extend substantially parallel to the shaft portion 43. As described above, the first engagement portions 51 of the first locking pieces 50 constitute portions to be brought into engagement with the circumferential edges of the back sides of the cutout grooves 27 and which are brought into engagement with the circumferential edge of the back side of the mounting hole 3. Note that the insertion portions 52 constitute portions which are inserted into inner circumference of the cutout grooves 27 or an inner circumference of the mounting hole 3 when the first engagement portions 51 are brought into engagement with the cutout grooves 27 or the mounting hole 3.

Further, the pair of second locking pieces 55, 55, which are flexible, are provided to extend obliquely outwards into an anchor shape towards the head portion 41 from distal end sides of both the facing side portions 44a of the base portion 44. The step-like second engagement portions 56, 56 are provided at distal end portions of the second locking pieces 55, respectively. As shown in FIG. 8, the second engagement portions 56, 56 are brought into the circumferential edges on the back sides of the cutout grooves 27 so as to hold the state in which the first locking pieces 51 are pulled inside.

Between the grommet 20 and the pin 40 configured as above, the coil spring 70, which constitutes the urging unit, is interposed. The coil spring 70 will be described in association with an assembling procedure of the pin 40 to the grommet 20. Firstly, the coil spring 70 is inserted into the cylindrical portion 29 of the grommet 20 and the one end thereof is supported on the inner end face of the bottom portion 32. In this state, the first locking pieces 50, 50 are aligned with the cutout grooves 27, 27, and the shaft portion 43 is inserted into the cylindrical portion 29 through the insertion hole 25, the other end of the coil spring 70 being supported on the distal end face of the distal end portion 46 of the shaft portion 43. Then, the pin 40 is pushed into the grommet 20 against the urging force of the coil spring 70.

Then, the first locking pieces 50, 50 are pressed by the inner circumferences of the cutout grooves 27 to thereby flex inwards. When the first engagement portions 51, 51 pass through the cutout grooves 27 to appear from the back sides thereof, the first locking pieces 50, 50 are elastically restored, whereby the first engagement portions 51, 51 are brought into engagement with the circumferential edges on the back sides of the cutout grooves 27, 27. Thus, the pin 40 is held in the grommet 20 so as not to be dislodged therefrom in such a state that the first locking pieces 50 project from the opening portions 34.

As this occurs, the coil spring 70 is interposed between the grommet 20 and the pin 40 in a compressed state with the one end supported on the inner end face of the bottom portion 32 of the cylindrical portion 29 and the other end supported on the distal end face of the distal end portion 46 of the shaft portion 43, and the pin 40 is assembled to the grommet 20 in such a state that the pin 40 is biased in an opposite direction (refer to an arrow in FIG. 5) to the direction in which the pin 40 is pushed into the grommet 20. In this embodiment, in particular, since the coil spring 70 is adopted as the urging unit, the strong urging force can be stably applied to the pin.

Next, a method for using the above-described clip 10 will be described.

Namely, the through hole 7 is aligned with the mounting hole 3, the mounting-subject member 5 is disposed on the mount-base member 1, and the pin 40 is assembled to the grommet 20 with the coil spring 70 interposed therebetween to complete the building up of the clip 10. The clip 10 is inserted from the side of the mounting-subject member 5 (refer to FIG. 1). Then, the pair of first locking pieces 50, 50 which project from the corresponding opening portions 34 through the through holes 7 are pressed against by the inner circumference of the mounting hole 3 to thereby flex inwards. Then, when the first engagement portions 51 pass through the corresponding cutout grooves 27 and the first engagement portions 51, 51 reach the back side of the mounting hole 3, the first locking pieces 50, 50 are elastically restored, whereby the first engagement portions 51, 51 are brought into engagement with the circumferential edge of the back side of the mounting hole 3. Together with this, the flange portion 21 of the grommet 20 is brought into engagement with the circumferential edge of the front side of the through hole 7, whereby the mounting-subject member 5 is sandwiched to the mount-base member 1 by both the first engagement portions 51, 51 and the flange portion 21. Thus, as shown in FIG. 6, the mounting-subject member 5 can be mounted on the mount-base member 1.

As this occurs, since the pin 40 is biased by the coil spring 70, which is the urging unit, in the opposite direction to the direction in which the pin 40 is pushed into the grommet 20, the first locking pieces 50 are pressed towards the back side of the mounting hole 3 as shown by an arrow in FIG. 6. As a result, even in the event that the thickness of the mount-base member 1 changes due to a dimension error, the clip 10 can flexibly deal with the change so that the clip can be stably fixed in the mounting hole 3 without any looseness.

In addition, in the case of the mount-base member 1 being a flexible trim board or the like, the trim board may become thinner than a certain thickness due to permanent setting in fatigue. Even in such a case, the first engagement portions 51 of the first locking pieces 50 are brought into strong engagement with the circumferential edge of the back side of the mounting hole 3 by the urging force of the coil spring 70, so that the clip 10 can be fixed in the mounting hole 3 without any looseness.

In addition, as shown in FIG. 7, even in the event that the thickness of the mount-base member 1 is thick, the first engagement portions 51 of the first locking pieces 50 of the pin 40 which are now pushed upwards by the urging force of the coil spring 70 are brought into strong engagement with the circumferential edge of the back side of the mounting hole 3. In this case, also, the clip 10 can be fixed in the mounting hole 3 without any looseness. In addition, as this occurs, the coil spring 70 is press contracted by the change in thickness, and the whole of the pin 40 is pushed in further so as to shift the positions of the first engagement portions 51. Thus, the clip 10 can be stably fixed without applying an excessive load onto the first locking pieces 50, unlike to a conventional fashion.

In addition, when removing the mounting-subject member 5 from the mount-base member 1 for the reason of maintenance, the pin 40 only has to be pushed further into the grommet 20 against the urging force of the coil spring 70 from the state in which the clip 10 is fixed in the mounting hole 3 as shown in FIG. 6. Then, as shown in FIG. 8, the second locking pieces 55, 55 are caused to flex inwards by inner circumferential edges of the cutout grooves 27, 27 in the grommet 20. Together with this, the first locking pieces 50, 50 are pressed by circumferential edges at distal end sides of the opening portions 34 and are then caused to flex inwards so as to be pulled inside from the opening portions 34, 34, whereby the first engagement portions 51 are disengaged from the circumferential edge of the back side of the mounting hole 3. Further, when the pin 40 is pushed in and the second engagement portions 56 of the second locking pieces 55 pass through the cutout grooves 27 to appear from the circumferential edges of the back sides of the cutout grooves 27, the second locking pieces 55, 55 are elastically restored, and the second engagement portions 56, are brought into engagement with the corresponding circumferential edges of the back sides of the cutout grooves 27, 27, whereby the first locking pieces 50, 50 are kept pulled inside the opening portions 34. In this state, by lifting the clip 10 together with the mounting-subject member 5, the clip 10 can be pulled out of the mounting hole 3, whereby the mounting-subject member 5 can be removed from the mount-base member 1.

In this embodiment, since the cutout grooves 27, 27 provided in the flange portion 21 of the grommet 20 function as the holding portion which holds the pin 40 in the grommet 20 so as to be prevented from being dislodged therefrom in such a state that the pin 40 is still allowed to be pushed in further, the pin 40 can be held in the grommet 20 so as not to be dislodged therefrom only by pushing the pin 40 slightly into the grommet 20. Thus, the push-in amount of the pin 40 into the grommet 20 can be ensured long, thereby making it possible to deal with the change in thickness of the member in which the mounting hole 3 is formed over a wider range.

FIGS. 9, 10 show another embodiment of a clip according to the invention. Note that like reference numerals will be given to substantially like portions to those of the above embodiment, and the description thereof will be omitted.

Compared with the clip 10 of the previous embodiment, a clip 10a of this embodiment differs therefrom with respect to a dislodgement prevention mechanism for a grommet 20 and a pin 40.

Namely, as shown in FIGS. 9, 10, a through hole 32b (corresponding to the holding portion of the invention) is formed in a bottom portion 32 of the grommet 20. On the other hand, a shaft portion 43 of the pin 40 has a circular cylindrical guide shaft 57 which projects from a distal end face of a distal end portion 46 and a projecting shaft 59 which projects from a distal end of the guide shaft 57 and whose diameter is made smaller than that of the guide shaft 57. Half-cut flexible engagement claws 63, 63 (corresponding to the engagement portion of the invention) are provided on an outer circumference of the distal end of the projecting shaft 59 so as to project therefrom via a slit 61. An outer circumference of each of the engagement claws 63, 63 has a tapering shape which tapers towards a distal end thereof. In addition, a pair of engagement projections 65, 65 are provided on outer circumferences of the engagement claws 63, 63 in positions which lie axially intermediate of the projecting shaft 59 and lie closer to a proximal side of the projecting shaft 59 than the engagement claws 63 so as to project therefrom.

When the pin 40 is pushed into the grommet 20 with a coil spring 70 fitted on an outer circumference of the guide shaft portion 57, the outer circumferences of the half-cut engagement claws 63, 63 are pressed against by an inner circumference of the through hole 32b and are caused to flex inwards. When the engagement claws 63 pass through the through hole 32b to appear from a projecting side (an outer surface side) of the through hole 32b, the engagement claws 63, 63 are brought into engagement with a circumferential edge on the projecting side of the through hole 32b, whereby the pin 40 is held in the grommet 20 so as not to be dislodged therefrom with first locking pieces 50 projecting from opening portions 34.

As with the previous embodiment, when the clip 10a in which the pin 40 is assembled to the grommet 20 is inserted into the mounting hole 3, first engagement portions 51 are brought into engagement with a circumferential edge on a back side of the mounting hole 3, whereby the clip 10a is fixed in the mounting hole 3 (refer to FIG. 9).

In this embodiment, since the projecting shaft 59 of the shaft portion 43 of the pin 40 is movably inserted into the through hole 32b, a push-in amount of the pin 40 into the grommet 20 can be ensured. Since the guide shaft 57 of the shaft portion 43 of the pin 40 is inserted in the coil spring 70, the inclination and positional offset of the coil spring 70 can be suppressed.

In addition, when removing the clip 10a from the mounting hole 3, as shown in FIG. 10, by pushing in the pin 40 further from the state in which the clip 10a is fixed in the mounting hole 3 as shown in FIG. 9, the pair of engagement projections 65, 65 are brought into engagement with the circumferential edge on the back side of the through hole 32b, whereby the clip 10a can be pulled out of the mounting hole 3 with the first locking pieces 50 kept pulled inside from the opening portions 34.

FIGS. 11A to 13 show a further embodiment of a clip of the invention. Note that like reference numerals will be given to substantially like portions to those of the above embodiment, and the description thereof will be omitted.

Compared with the clips 10, 10a of the previous embodiments, a clip 10b of this embodiment differs therefrom with respect to an urging force application mechanism by an urging unit.

Namely, in the clip 10b of this embodiment, the coil spring 70 is not used as the urging unit, but a configuration is adopted in which a resin spring 70a which is formed integrally with a pin 40 is used. As shown in FIGS. 11A to 11C, the resin spring 70a includes a pair of support pieces 71, 71 which project from a distal end portion 46 of a shaft portion 43 of the pin 40 so as to gradually move obliquely outwards away from each other and spring pieces 73, 73 which extend from distal ends of the support pieces 71, 71 so as to gradually approach each other obliquely inwards and which are connected together at end portions thereof.

On the other hand, as shown in FIG. 12, an elongated hole-shaped through hole 32c is formed in a bottom portion 32 of the grommet 20, and a circumferential edge of the through hole 32c constitutes a spring abutment portion 36 which is inclined obliquely upwards.

The construction in which the pin 40 is held in the grommet 20 so as to be dislodged therefrom is similar to that of the clip 10 shown in FIGS. 1 to 7. Namely, when the pin 40 is inserted into the grommet 20, the spring pieces 73, 73 of the resin spring 70a are inserted into the through hole 32c, and first engagement portions 51 of first locking pieces 50 are brought into engagement with circumferential edges on back sides of cutout grooves 27, whereby the pin 40 is held in the grommet so as not to be dislodged therefrom. As this occurs, the spring pieces 73, 73 are brought into abutment with a spring abutment portion 36 provided on the grommet 20 so as to flex. Thus, the pin 40 is biased in an opposite direction to a direction in which the pin 40 is pushed into the grommet 20 by the restoring force of the spring pieces 73, 73.

As shown in FIG. 12, by inserting the clip 10b in which the pin 40 is assembled to the grommet 20 is inserted into a mounting hole 3, the first engagement portions 51 are brought into engagement with a circumferential edge on a back side of the mounting hole 3, whereby the clip 10b is fixed in the mounting hole 3. As this occurs, by the first locking pieces 50 being brought into engagement with the mounting hole 3, the pin 40 is pushed in further, and the spring pieces 73, 73 are brought into strong abutment with the spring abutment portion 36 on the grommet 20 to thereby flex. The elastic restoring force of the spring pieces 73, 73 becomes larger than the mounted state, whereby the first locking pieces 50 are strongly pressed against the back side of the mounting hole 3, whereby the clip 10b can be fixed in the mounting hole 3 without any looseness.

When removing the clip 10b from the mounting hole 3, by pushing in the pin 40 further from the state above against the urging force of the resin spring 70a, as shown in FIG. 13, second engagement portions 56 are brought into engagement with circumferential edges of back sides of cutout grooves 27, and the first locking pieces 50 are held pulled inside from opening portions 34, whereby the clip 10b can be pulled out of the mounting hole 3.

BRIEF DESCRIPTION OF THE DRAWINGS

FIGS. 4A to 4C show a pin of the clip, in which FIG. 4A is a front view, FIG. 4B is a side view and FIG. 4C is a bottom view of the pin.

FIGS. 11A to 11C show a further embodiment of a clip of the invention, in which FIG. 11A is a front view of a pin of the clip, FIG. 11B is a side view of the pin, and FIG. 11C is a bottom view of the pin.

Figure 1:
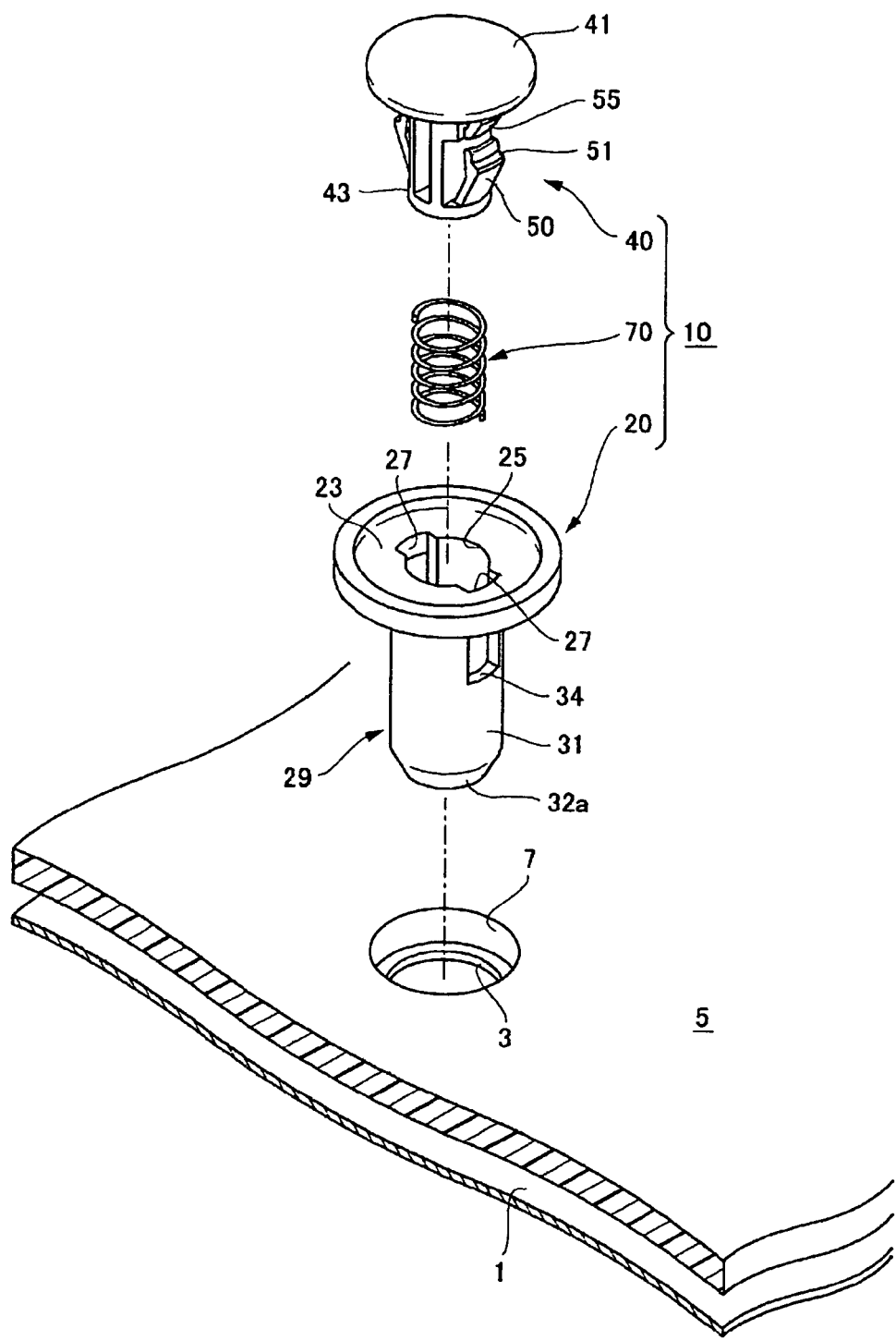
FIG. 1 is an exploded perspective view showing an embodiment of a clip of the invention.
Figure 2:
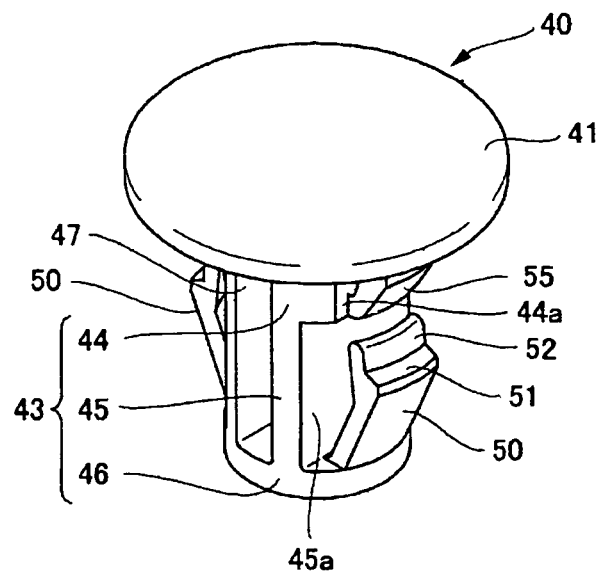
FIG. 2 is a perspective view of a pin of the clip.
Figure 3:
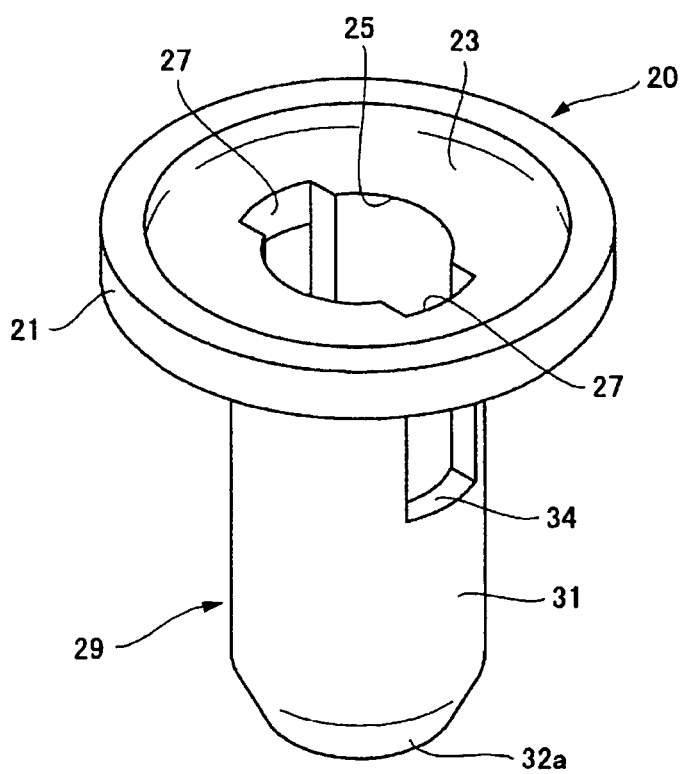
FIG. 3 is a perspective view of a grommet of the clip.
Figure 4A:
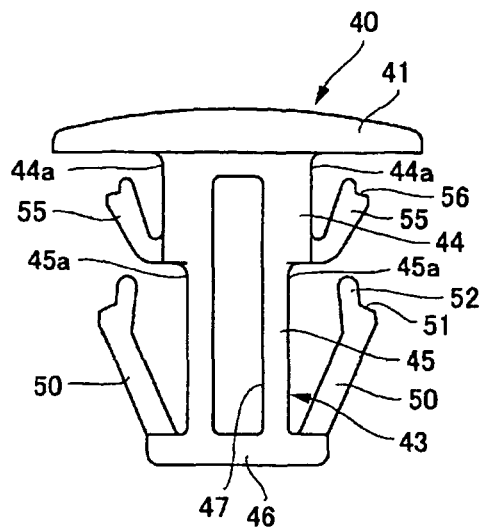
Figure 4B:
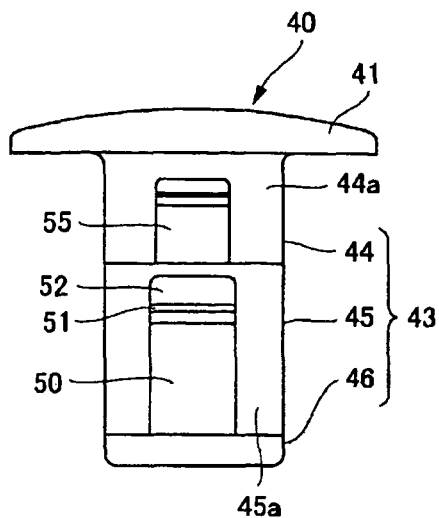
Figure 4C:
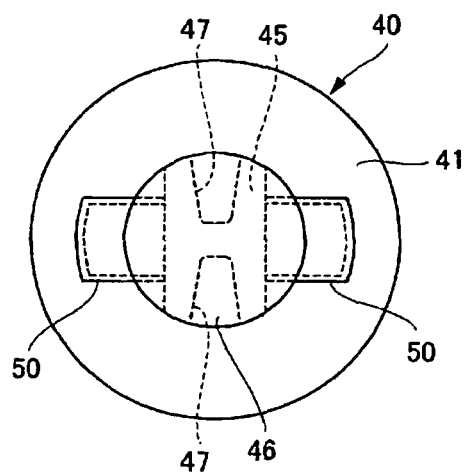
Figure 5:
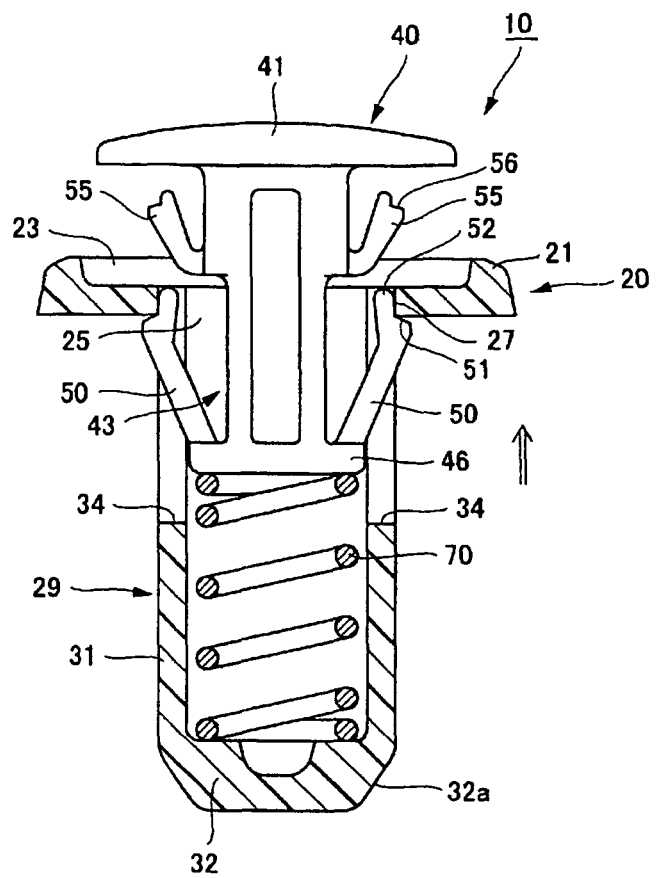
FIG. 5 is an explanatory drawing showing a state in which the pin is assembled to the grommet.
Figure 6:
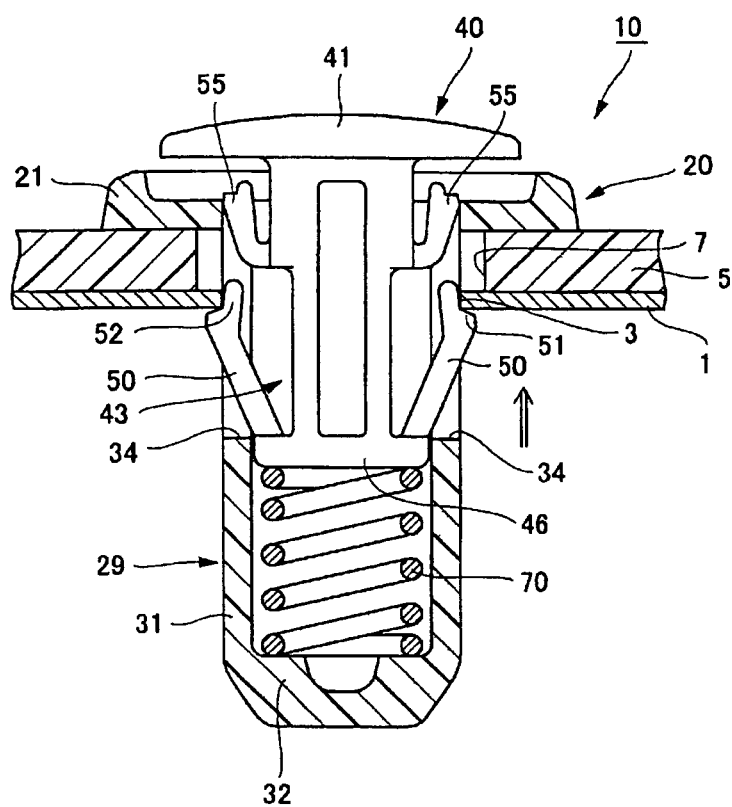
FIG. 6 is an explanatory drawing showing a state in which the clip of the invention is fixed in a mounting hole.
Figure 7:
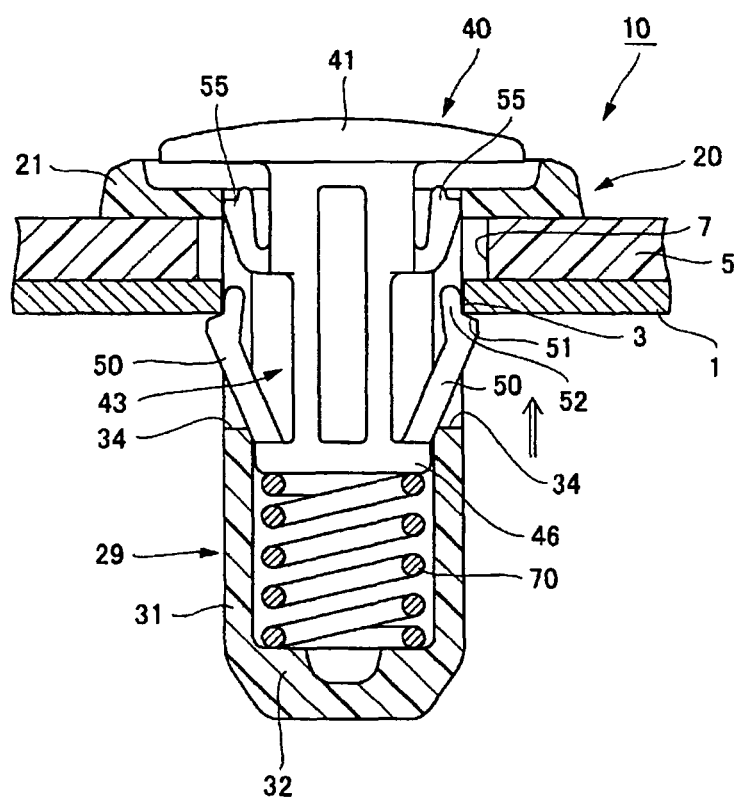
FIG. 7 is an explanatory drawing showing a state in which the clip is fixed in a mounting hole in a mount-base member whose thickness is thick.
Figure 8:
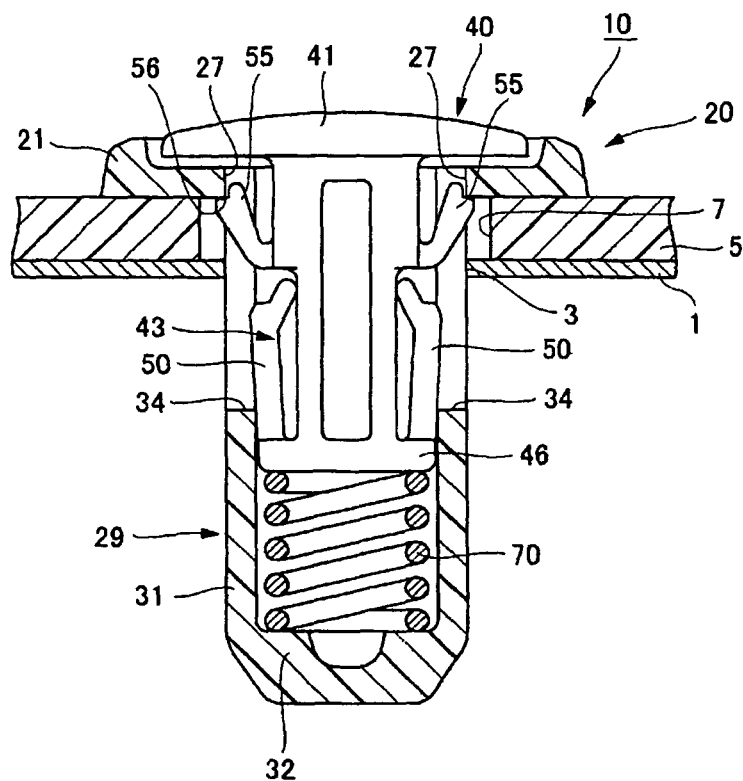
FIG. 8 is an explanatory drawing showing a state in which the clip is removed from the mounting hole.
Figure 9:
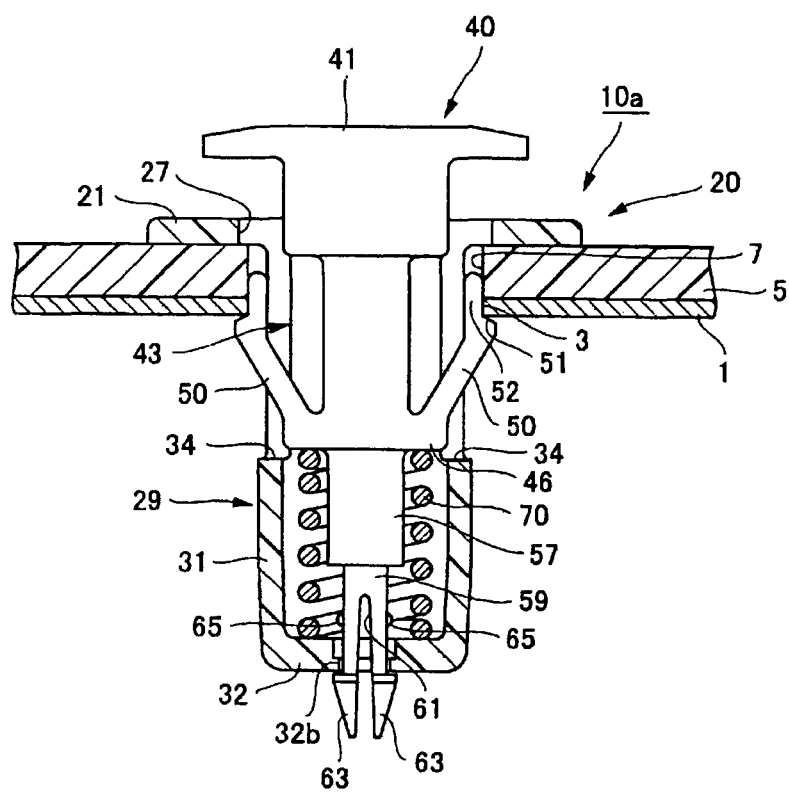
FIG. 9 is an explanatory drawing showing another embodiment of a clip of the invention, which shows a state in which the clip is fixed in a mounting hole.
Figure 10:
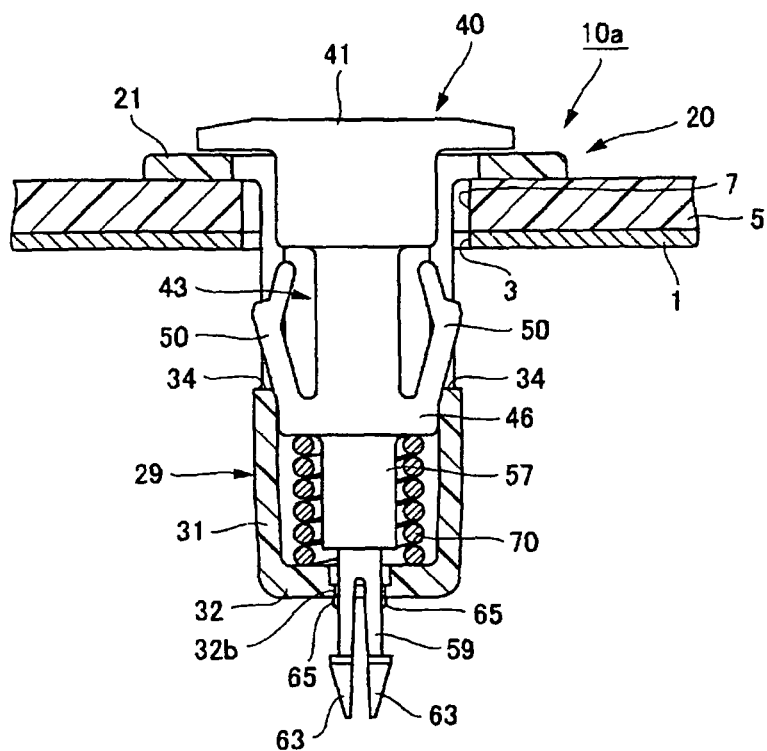
FIG. 10 is an explanatory drawing showing a state in which the clip is removed from the mounting hole.
Figure 12:
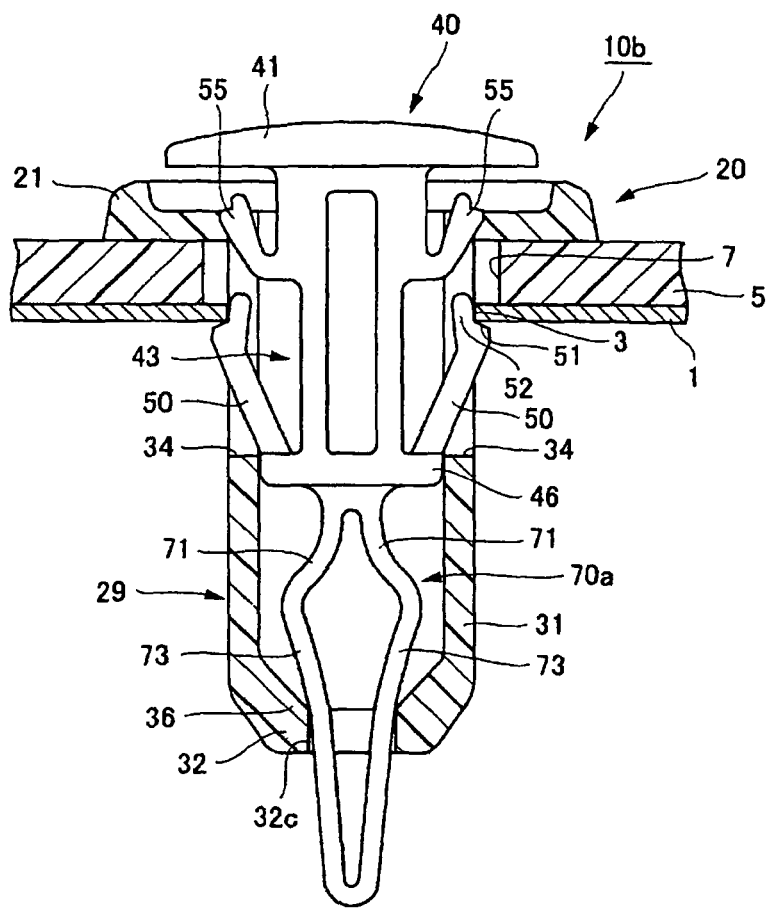
FIG. 12 is an explanatory drawing showing a state in which the clip is fixed in a mounting hole.
Figure 13:
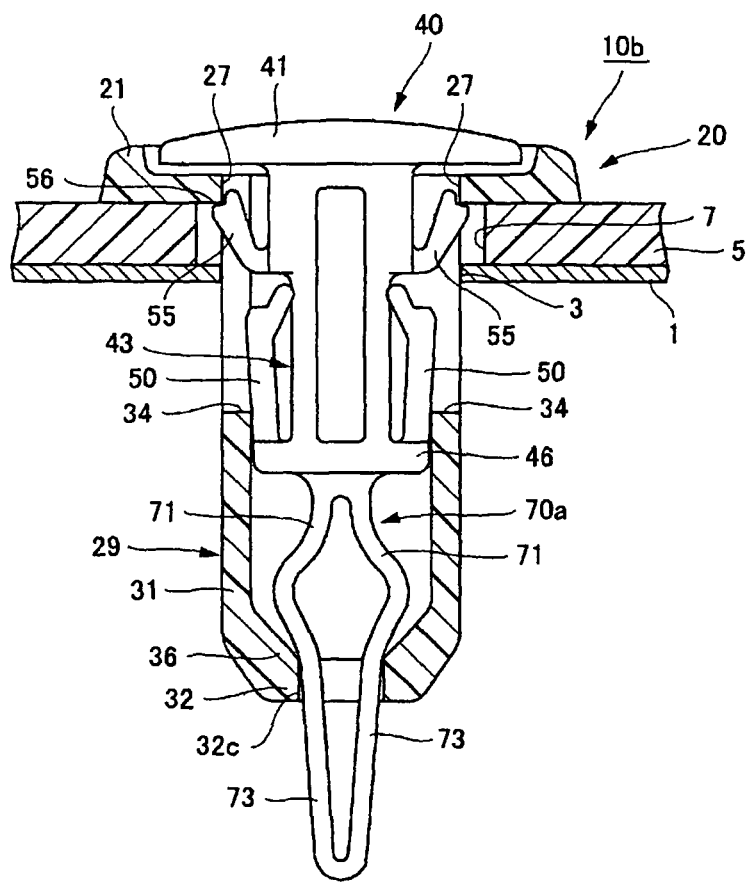
FIG. 13 is an explanatory drawing showing a state in which the clip is removed from the mounting hole.

DESCRIPTION OF REFERENCE NUMERALS 3 mounting hole; 10, 10a, 10b clip; 20 grommet; 21 flange portion; 25 insertion hole; 27 cutout groove (holding portion); 29 cylindrical portion; 31 circumferential wall; 32 bottom portion; 32b through hole (holding portion); 34 opening portion; 40 pink; 41 head portion; 43 shaft portion; 50 first locking piece (locking piece); 51 first engagement portion (engagement portion); 63 engagement claw (engagement portion); 70 coil spring; 70a resin spring (urging unit).

The invention claimed is:
1. A clip including a grommet and a pin which is inserted into the grommet and adapted to be inserted to be fixed in a mounting hole,
wherein the pin comprises:
a head portion;
a shaft portion which projects from one side of the head portion;

a locking piece, which is provided flexibly on an outer circumference of the shaft portion, adapted to be locked on a circumferential edge of the mounting hole; and an engagement portion which is engaged with the grommet so as to prevent a dislodgement, wherein the grommet comprises:

a flange portion having an insertion hole into which the shaft portion of the pin is inserted;

a cylindrical portion which projects from a circumferential edge of the insertion hole in the flange portion;

an opening portion which is formed in a circumferential wall of the cylindrical portion so as to allow the locking piece of the pin to project therefrom; and a holding portion which is engaged with the engagement portion of the pin so as to hold the pin in such a state that the pin can be pushed in further while preventing the dislodgement, wherein an urging unit is provided to urge the pin in an opposite direction to a direction in which the pin is pushed in relative to the grommet, wherein, by pushing in the pin from a state in which the engagement portion of the pin is held by the holding portion of the grommet, the locking piece is configured to be pulled inside from the opening portion, and wherein another engagement portion is provided for engagement with the holding portion so as to hold the pin in the state in which the locking piece is pulled inside from the opening portion.

2. The clip of claim 1, wherein the urging unit comprises a coil spring which is interposed between the pin and the grommet.

3. The clip of claim 1, wherein a through hole is formed in a bottom portion of the cylindrical portion and an engagement claw is formed at a distal end of the shaft portion of the pin so as to be inserted through the through hole for engagement with a circumferential edge on a projected side of the through hole, and wherein the through hole constitutes the holding portion and the engagement claw constitutes the engagement portion.

4. The clip of claim 3, wherein an engagement projection is provided at an axial intermediate position of the shaft portion of the pin, and wherein the engagement projection on the shaft portion constitutes said another engagement portion.

5. The clip of claim 4, wherein the urging unit comprises a coil spring.

6. The clip of claim 1, wherein, when the locking piece is configured to be pulled inside from the opening portion, the clip can be thereby withdrawn from the mounting hole.

* * * * *